(12) United States Patent
She (10) Patent No.: US 8,984,075 B2
(45) Date of Patent: Mar. 17, 2015

(54) METHOD AND SYSTEM FOR BROADCASTING MULTIMEDIA MESSAGE

(75) Inventor: Kun She, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 84 days.

(21) Appl. No.: 13/392,622

(22) PCT Filed: May 14, 2010

(86) PCT No.: PCT/CN2010/072789
§ 371 (c)(1),
(2), (4) Date: Feb. 27, 2012

(87) PCT Pub. No.: WO2011/029315
PCT Pub. Date: Mar. 17, 2011

(65) Prior Publication Data
US 2012/0158876 A1 Jun. 21, 2012

(30) Foreign Application Priority Data
Sep. 11, 2009 (CN) .......................... 2009 1 0172962

(51) Int. Cl.
*G06F 15/16* (2006.01)
*H04L 12/18* (2006.01)
(Continued)

(52) U.S. Cl.
CPC ........... *H04L 12/1854* (2013.01); *H04L 12/185* (2013.01); *H04L 12/1886* (2013.01); *H04L 51/10* (2013.01); *H04L 67/104* (2013.01)
USPC ............................ 709/206; 709/218; 709/242

(58) Field of Classification Search
CPC .............. H04L 67/104; H04L 67/1095; H04L 67/2885; H04L 65/4076; H04H 20/08; H04W 76/002; H04W 28/10
USPC .......................................... 709/206, 218, 242
See application file for complete search history.

(56) References Cited

U.S. PATENT DOCUMENTS 7,808,959 B2 * 10/2010 Guo .............................. 370/338
8,171,071 B2 * 5/2012 Bourne ........................ 709/201
(Continued)

FOREIGN PATENT DOCUMENTS

| CN | 1984315 A | 6/2007 |
|----|-----------|--------|
| CN | 101304385 A | 11/2008 |

(Continued)

OTHER PUBLICATIONS

International Search Report for PCT/CN2010/072789, English translation attached to original, Both completed by the Chinese Patent Office on Aug. 13, 2010, All together 8 pages.
(Continued)

*Primary Examiner* — Waseem Ashraf
(74) *Attorney, Agent, or Firm* — Brooks Kushman P.C.

(57) ABSTRACT

A method and system for broadcasting a multimedia message are disclosed. The method includes: a broadcasting source node packs multimedia content to be broadcasted into a multimedia message, and sends the multimedia message to a reception end node in structural Peer-to-Peer which establishes a virtual connection with the present broadcasting source node; the reception end node receiving the multimedia message forwards the multimedia message to other reception end nodes establishing a virtual connection with the present reception end node. The method and system can save bandwidth and processing capability resources of the whole overlay network, and can make loads be distributed to nodes except the broadcasting source node more evenly to prevent the broadcasting source node from being bottleneck.

8 Claims, 3 Drawing Sheets

(51) Int. Cl.
*H04L 12/58* (2006.01)
*H04L 29/08* (2006.01)

(56) References Cited

U.S. PATENT DOCUMENTS

| | | | |
|---|---|---|---|
| 2006/0098668 A1* | 5/2006 | Dona | 370/401 |
| 2007/0198740 A1* | 8/2007 | Peters et al. | 709/245 |
| 2007/0244894 A1* | 10/2007 | St. Jacques | 707/9 |
| 2008/0107130 A1* | 5/2008 | Peters et al. | 370/466 |
| 2008/0200190 A1* | 8/2008 | Malcolm et al. | 455/466 |
| 2008/0235244 A1 | 9/2008 | Matsuo | |
| 2008/0279206 A1* | 11/2008 | Yanagihara | 370/408 |
| 2009/0116412 A1* | 5/2009 | Yanagihara | 370/256 |
| 2009/0180489 A1* | 7/2009 | Fujita et al. | 370/409 |
| 2009/0180493 A1* | 7/2009 | Hirano et al. | 370/464 |
| 2009/0274160 A1* | 11/2009 | Yanagihara | 370/408 |
| 2009/0288127 A1* | 11/2009 | Corson et al. | 725/110 |
| 2011/0085488 A1* | 4/2011 | Widegren | 370/312 |

FOREIGN PATENT DOCUMENTS

| | | |
|---|---|---|
| CN | 101394339 A | 3/2009 |
| CN | 101394415 A | 3/2009 |
| WO | 2008/102195 | 8/2008 |

OTHER PUBLICATIONS

Hai Jin et al., Boundary Chord: A Novel Peer-to-Peer Algorithm for Replica Location Mechanism in Grid Environment, IEEE Computer Society, 2005, pp. 1-6.

* cited by examiner

METHOD AND SYSTEM FOR BROADCASTING MULTIMEDIA MESSAGE

CROSS-REFERENCE TO RELATED APPLICATION

This application is the U.S. national phase of PCT Appln. No. PCT/CN2010/072789 filed May 14, 2010 which claims priority to Chinese Application No. 200910172962.4 filed Sep. 11, 2009, the disclosures of which are incorporated in their entirety by reference herein.

TECHNICAL FIELD

The present invention relates to the field of Internet technology, and more especially, to a method and a system for broadcasting a multimedia message.

BACKGROUND OF THE RELATED ART

The Peer-to-Peer (P2P) network is a kind of distributed application architecture, and is mainly composed of a plurality of peer nodes. The peer nodes share a part of their own resources, such as the processing capability and network bandwidth and so on, and provide services for all peer nodes (including themselves) in common. On the service path of the P2P network, there is no server in the traditional sense, and furthermore, the peer nodes can dynamically join in and quit the network, and therefore, the P2P network has self-organization. Each peer node provides and enjoys services in the meantime, which makes the P2P network have a very good extensibility and to be able to serve an extremely enormous user group. The distribution of service resources in the network has a certain redundancy, that is, the resources of once service procedure can be from multiple peer nodes, so that the P2P network will not cause a service breakdown due to the failure of the single point.

Figure 1:
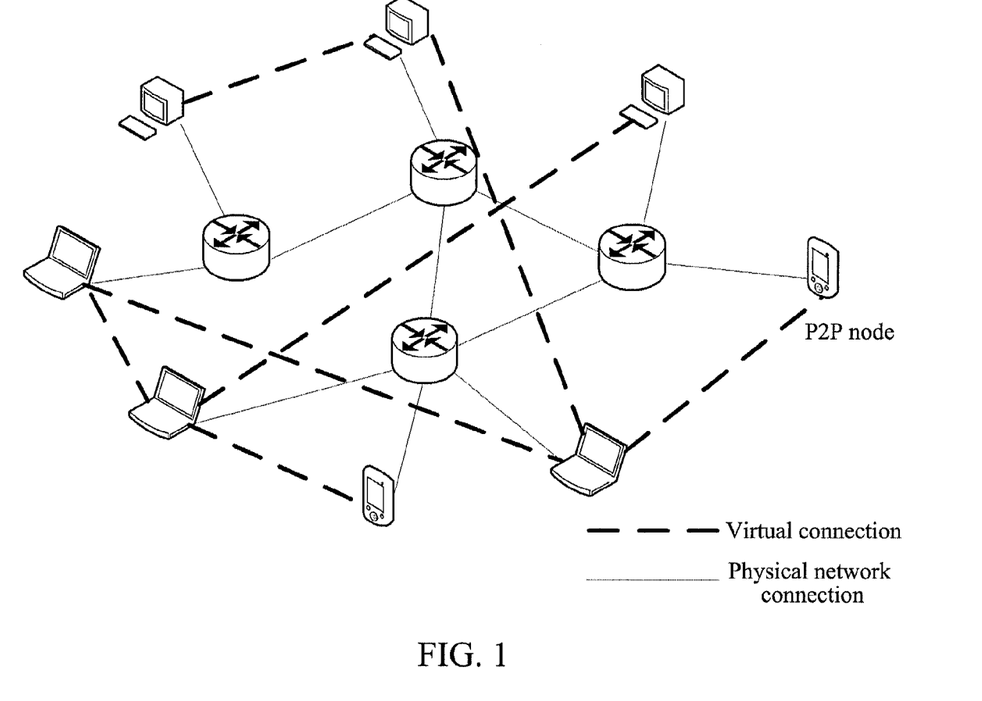
FIG. 1 is an architectural diagram of the P2P network.

Considering from the implementation, the P2P network is a kind of application layer overlay network and is established on a variety of physical networks. The overlay network completes functions of resources indexing and node discovery and so on, however, the communication contents are directly sent by the physical networks (normally the IP networks) under the overlay network. The peer nodes are connected through virtual links, as shown in FIG. 1, these virtual links are implemented in the application layer, and thus, the virtual links are not affected by the topology structures of physical network such as fire wall and Network Address Translation (NAT), etc.

The P2P network can be divided into two types of the structured P2P network and the unstructured P2P network. For a structured P2P network, the virtual connection between nodes is established according to certain rules, optimizes the resources index, and is relatively fixed (unless the virtual connection is affected by the events of the breakdown of the peer node, and the peer node joining in or quitting the P2P network, etc.). For example, the Distributed Hash Table (DHT) is a kind of resource index algorithm usually used in the structured P2P network. The operating principle of the structured P2P network is similar to that "keyword-resource value" provides a retrieval service of "providing keywords and returning a resource value" for a composed hash table, and the difference is that the mapping relationship between the keyword and the resource value is distributed to be stored in different network nodes for the DHT. All possible keywords compose of a "keyword space", which is divided into small regions according to certain rules, and a specified peer node is responsible for a region. Each peer node can serve as an "application layer router" (which is different from routers, which route IP data packet, in a common sense), and route the resource access request to the node which is responsible for the resources, or to the node which is closer to the resources; this function depends on an application routing table (which is different from an IP routing table) maintained in each peer node, and the establishment process of the application routing table is a component part of the Peer to Peer protocol. In conclusion, for the structured P2P network, the resource access procedure can be briefly described as follows.

(1) The keyword of resources is calculated.

For example, when the resource is a file, the keyword is calculated by the file name through the Hash algorithm.

(2) The node which is responsible for maintaining the resource (called as a resource node for short) is deduced by the keyword according to the peer to pear algorithm.

(3) An application routing table is searched to find a virtual connection of the resource node, or find the virtual connection of another node which is closer to the resource node; and a resource access request (including the resource keyword) is sent through the found virtual connection.

(4) The node which receives the resource access request checks whether the node itself is responsible for the resource or not, and if yes, processes the request, and the procedure ends, otherwise repeats steps (2)-(4).

However, the unstructured P2P network does not have algorithms for organizing and optimizing the connections between nodes, and locating resources should be performed with the aid of the retrieval server, or should be performed by broadcasting the resource access requests to all known peer nodes. Compared with the structured P2P network, the main disadvantage of the unstructured P2P network is that the broadcasting flood will cause a lager waste of the network bandwidth. Furthermore, in the unstructured P2P network, broadcasting requests is a kind of practices with the best effort, which can't ensure that the request can reach the right node, thereby causing a service failure.

Due to high extensibility and fault tolerance of the P2P network, more and more Internet applications, especially multimedia applications with higher requirements for the resources, are implemented based on the P2P network. However, there is no mechanism for broadcasting multimedia messages in the current peer to peer network.

SUMMARY OF THE INVENTION

The technical problem to be solved in the present invention is to provide a method and a system for broadcasting a multimedia message, which implement the service functions of broadcasting the multimedia message in the structured P2P network.

To solve the foregoing technical problem, the present invention provides a method for broadcasting a multimedia message, which comprises:

a broadcast source node packaging multimedia contents to be broadcasted into a multimedia message, and sending the multimedia message to a receiving end node which has established a virtual connection with the present broadcast source node in a structured P2P network; and the receiving end node which receives the multimedia message forwarding the multimedia message to other receiving end nodes which have established virtual connections with the present receiving end node.

Preferably, in the step of the broadcast source node packaging the multimedia contents into the multimedia message, the broadcast source node packages the multimedia contents into an application layer data packet.

Preferably, in the step of the broadcast source node packaging the multimedia contents into the multimedia message, when an application transmission protocol on the virtual connection is a Session Initiation Protocol (SIP), the broadcast source node adopts a format of Multipurpose Internet Mail Extensions (MIME) to package the multimedia contents into a message body of a MESSAGE request.

Preferably, in the step of sending the multimedia message to the receiving end node which has established the virtual connection with the present broadcast source node in the structured P2P network, the broadcast source node divides all the receiving end nodes in an application routing table into a plurality of sets according to a next hop based on a preset rule, each set corresponds to one next hop node; the broadcast source node duplicates the multimedia message as copies of which a number is same as a total number of the sets that all the receiving end nodes are divided, and sends the multimedia message including information of each set respectively to the next hop node corresponding to each set;

in the step of forwarding the multimedia message to other receiving end nodes which have established the virtual connections with the node, after receiving the multimedia message, if the receiving end node determines that the present receiving end node is an only component in the set according to the information of the set included in the multimedia message, the receiving end node displays the multimedia message to users of the present receiving end node; and if the present the receiving end node is not an only component in the set, the receiving end node divides all the receiving end nodes in the application routing table of the present the receiving end node into a plurality of sets according to a next hop based on the preset rule, and duplicates the multimedia message as copies of which the number is same as the total number of the sets that all the receiving end nodes are divided, and sends the multimedia message including information of each set respectively to the next hop node corresponding to each set.

Preferably, the preset rule is as follows:
if one receiving end node in the application routing table has established a virtual connection with a present node, newly establishing a set for the receiving end node, and adding the receiving end node into the set;
if one receiving end node has not established a virtual connection with the present node, searching a next hop node from the present node to the receiving end node, and judging whether a set has been established for the next hop node, if the set has been established, adding the receiving end node into the set; if the set has not been established, newly establishing a set for the next hop node and adding the receiving end node into the set.

Preferably, the information of each set includes: list information of the receiving end nodes in the set.

Preferably, the list information of the receiving end nodes is include in a sub message body increased in a message body of the MESSAGE request in the format of the MIME.

To solve the foregoing technical problem, the present invention provides a system for broadcasting a multimedia message, which is applied in a structured P2P network, comprising a broadcast source node and receiving end nodes, wherein the broadcast source node comprises a data packaging module and a data sending module, and the receiving end node comprises a data forwarding module, wherein:

the data packaging module is configured to: package multimedia contents to be broadcasted into a multimedia message to transmit to the data sending module;
the data sending module is configured to: receive the multimedia message, and then send the multimedia message to the receiving end node which has established a virtual connection with the present broadcast source node;
the data forwarding module is configured to: forward the multimedia message to other receiving end nodes which have established the virtual connections with the present receiving end node after the receiving end node receiving the multimedia message.

Preferably, the data sending module is configured to: when sending the multimedia message to the receiving end node which has established the virtual connection with the present broadcast source node in the structured P2P network, divide all the receiving end nodes in an application routing table into a plurality of sets according to a next hop based on a preset rule, in which each set corresponds to one next hop node; and duplicate the multimedia message as copies of which a number is same as a total number of the sets that all the receiving end nodes are divided, and send the multimedia message including information of each set respectively to the next hop node corresponding to each set;

the data forwarding module is configured to: after the present receiving end node receiving the multimedia message, and if the node is an only component in the set according to the information of the set included in the multimedia message, display the multimedia message to users of the present receiving end node; otherwise, divide all the receiving end nodes in the application routing table into a plurality of sets according to a next hop based on the preset rule, and duplicate the multimedia message as copies of which the number is same as the total number of the sets that all the receiving end nodes are divided, and send the multimedia message including information of each set respectively to the next hop node corresponding to each set.

Preferably, the data sending module and data forwarding module adopt the following preset rule to divide all the receiving end nodes into the sets:
if a certain receiving end node in the application routing table has established a virtual connection with a present node, newly establishing a set for the receiving end node, and adding the receiving end node into the set;
if a certain receiving end node has not established a virtual connection with the present node, searching a next hop node from the present node to the receiving end node, and judging whether a set has been established for the next hop node, if the set has been established, adding the receiving end node into the set; if the set has not been established, newly establishing a set for the next hop node and adding the receiving end node into the set.

To solve the foregoing technical problem, the present invention provides a node for supporting to broadcast a multimedia message, which is applied in a structured P2P network, when serving as a broadcast source node, the node comprising a data packaging module and a data sending module, wherein:

the data packaging module is configured to: package multimedia contents to be broadcasted into a multimedia message, transmit the multimedia message to the data sending module;
the data sending module is configured to: send the multimedia message to a receiving end node which has established a virtual connection with the present node after receiving the multimedia message.

Preferably, the data sending module is configured to: when sending the multimedia message to the receiving end node which has established the virtual connection with the present node in the structured P2P network, divide all the receiving end nodes in an application routing table into a plurality of sets according to a next hop according to a preset rule, in which each set corresponds to one next hop node; and duplicate the multimedia message as copies of which a number is same as a total number of the sets that all the receiving end nodes are divided, and send the multimedia message including information of each set respectively to the next hop node corresponding to each set.

Preferably, the data sending module is configured to: adopt the following preset rule to divide all the receiving end nodes into the sets:
- if a certain receiving end node in the application routing table has established a virtual connection with the present node, newly establishing a set for the receiving end node, and adding the receiving end node into the set;
- if a certain receiving end node has not established a virtual connection with the node, then searching a next hop node from the present node to the receiving end node, and judging whether a set has been established for the next hop node, if the set has been established, adding the receiving end node into the set; if the set has not been established, newly establishing a set for the next hop node and adding the receiving end node into the set.

Compared with the related art, the above embodiments at least have the beneficial effects as follows:
- each peer node (including the broadcast source) only forwarding a message once at most can ensure that all the nodes can receive the message by adopting the "relay broadcast" mode of the structured P2P network. Compared with the unicast method by the broadcast source one by one, the above embodiments can save the bandwidth and processing capacity resources of the whole overlay network to a great extent; furthermore, make the load to be more equably distributed to the nodes besides the broadcast source, and avoid that the broadcast source becomes a processing bottleneck.

PREFERRED EMBODIMENTS OF THE PRESENT INVENTION

Figure 2:
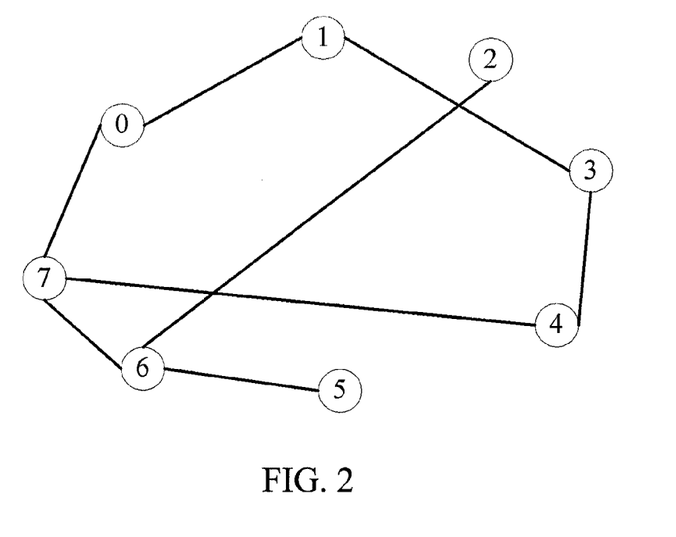
FIG. 2 is an architectural diagram of the service network of the multimedia message broadcast service.

FIG. 2 is the service network architecture of the multimedia message broadcast service, wherein the peer node can be divided into the broadcast source and the receiving end according to the service definition. As shown in FIG. 2, the broadcast source node 0 is responsible for generating and sending the multimedia message contents, the receiving ends 1~7 are responsible for receiving and forwarding the multimedia message contents and displaying the multimedia message contents to the users.

With respect to the network architecture of FIG. 2, the present invention provides a method for broadcasting the multimedia message, which adopts the "relay broadcast" mode to send a broadcast message, that is, the broadcast source node does not send the message to all the receiving end nodes one by one, but send the message to the nodes which have established the virtual connections with the broadcast source node and then these nodes "forwards" the message to other nodes, and so on, until all the nodes receive the multimedia message, wherein the multimedia message can further include media formats such as an audio clip, a picture and animation, etc. besides the text of message content.

Below the implementation of the technical scheme of the present invention will be further stated in detail with reference to drawings and specific examples.

Figure 3:
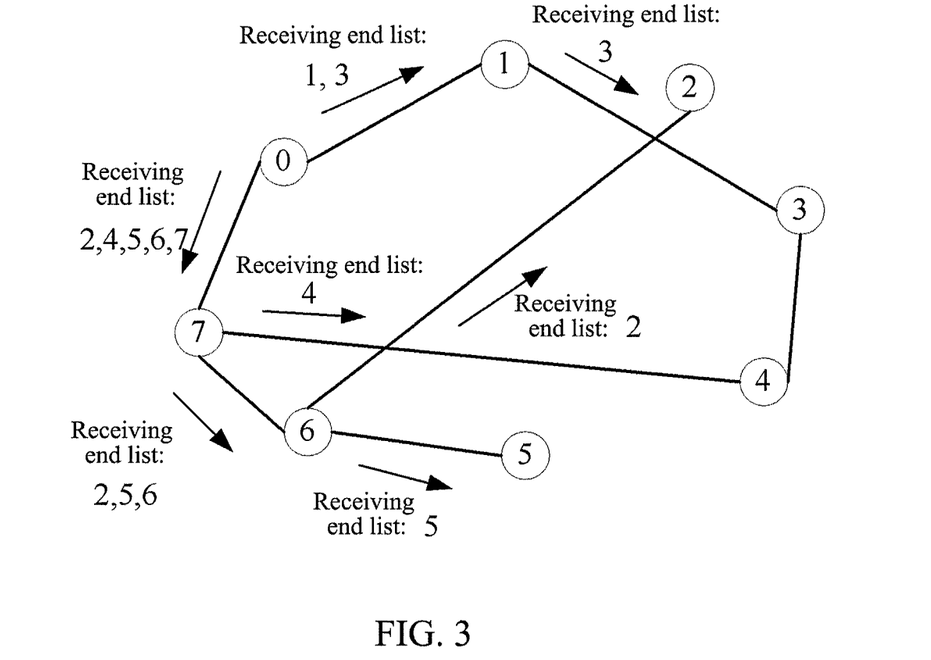
FIG. 3 is a schematic diagram of the relay broadcast mode of the multimedia message.

As shown in FIG. 3, when a certain peer node serves as the broadcast source and broadcasts a multimedia message to all the receiving ends, the processing procedure comprises following steps.

Step 1, the broadcast source node packages the multimedia message;

the broadcast source node packages the multimedia contents to be broadcasted into an application layer data packet. For example, when the application transmission protocol on the virtual connections is a Session Initiation Protocol (SIP), the multimedia data can be packaged into the message body of the MESSAGE request in a format of the Multipurpose Internet Mail Extensions (MIME).

However, the present invention is not limited to the SIP, and is also applicable to other application transmission protocols.

Step 2, the broadcast source node checks the application routing table, and divides all the receiving end nodes into a plurality of sets according to the next hop based on the following preset rules:

(1) if a certain receiving end node (denoted as Rm) establishes a virtual connection (i.e., the receiving end has a corresponding routing item in the routing table) with the present node, a set (denoted as Sm) is newly established for the Rm and the Rm is the only component in the newly established set;

(2) if a receiving end node (denoted as Rn) does not establish a virtual connection with the present node, the next hop node Hn from the present node to the receiving end node Rn is searched based on the Chord algorithm, and it is judged whether a set has been established for the next hop node Hn, if a set (denoted as Sn) has been established for the Hn, the receiving end node Rn is added into the set Sn; if the set has not been established, a set (denoted as Sn) is established for the Hn and the Rn is added into the set.

Figure 4:
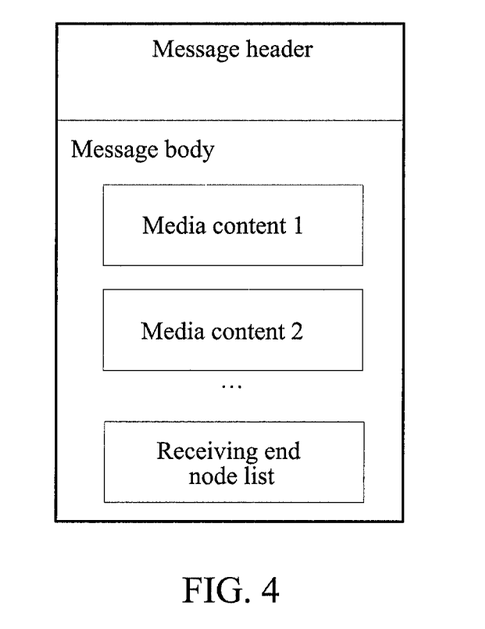
FIG. 4 is a packaging format of the multimedia message according to the application example of the present invention.

Step 3, the broadcast source node divides all the receiving end nodes into M sets (S1-SM, each set corresponds to one next hop node) based on the above rules, and then duplicates M copies of the multimedia message, each copy attaches information of the corresponding set, and the information can be list information of the components of receiving end nodes included in the set, for example, each copy corresponds to a different receiving end list which is attached in the message copy to be sent to the node which has established the virtual connection;

wherein the format of the receiving end list information attached in the multimedia message includes but is not limited to: adding one sub message body into the message body in the format of the MIME, and the multimedia message format of the sub message body is shown in FIG. 4.

Step 4, when receiving the multimedia message, the receiving end node first checks the receiving end node list attached in the message, and if the receiving end node itself is the only item in the list, the receiving end node only processes the multimedia message, for example, displaying the message to the users of the present node; if the list further includes other nodes, the receiving end node also divides the other nodes except the receiving end node itself into a plurality of sets according to the records of the application routing table of the present node, in which the rules are the same as the above; meanwhile, the receiving end node also establishes copies of the multimedia message for each set, and attaches the receiving end node list to be forwarded once more.

Step 5, the step 4 is repeated until all the receiving end nodes receive the multimedia message, and the procedure ends.

In this scheme, the Chord is adopted as the peer to peer algorithm. The present invention is based on the P2P network technology, but is not limited to a specific peer to peer algorithm. Furthermore, the management of the P2P network includes: the joining in and departure of the peer node, and the update process of the node application routing table, is not the content that the present invention concerns, which will not be repeated here.

The present invention can be applied to release announcement information among the specific groups, and the typical application scenarios include but are not limited to the following two examples:

(1) the present invention is used by the residential property management company for broadcasting the notice information of no water, no electricity, and corrective maintenance and so on to the residents in the district;

(2) the present invention is used by the market businessmen for broadcasting the discount information of products to the customers, etc.

The present invention is the core technique of the above applications, and the implementation of the above applications further relates to techniques of broadcasting authorization, operator policy control and location-based service and so on, but these techniques can be implemented by using the contents in the related art.

In conclusion, the present invention is based on the overlay network to implement the broadcasting. Compared with the network layer (e.g., IP) broadcast or multicast technique, the present invention has the advantages of not being affected by the topology structures (e.g., the fire wall and NAT) and not having limitations of the regions (the network layer broadcast cannot span the layer 3 network devices such as the router and the gateway, etc.) and physical network types (the virtual connection between the peer nodes can be TCP/IP and PPP, etc.).

Figure 5:
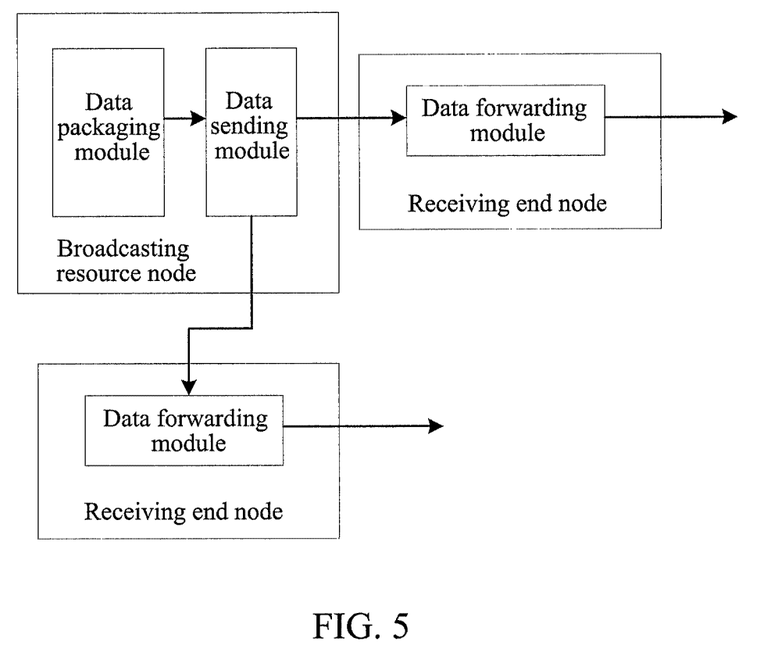
FIG. 5 is a schematic block diagram of the system for broadcasting the multimedia message based on the structured P2P network according to the example of the present invention.

Furthermore, as shown in FIG. 5, the present invention further provides a system for broadcasting a multimedia message based on the structured P2P network, and the system is applied in the structured P2P network and comprises a broadcast source node and receiving end nodes, wherein the broadcast source node further comprises a data packaging module and a data sending module, and the receiving end node further comprises a data forwarding module, wherein:

the data packaging module is configured to: package the multimedia contents to be broadcasted into a multimedia message to transmit to the data sending module;

the data sending module is configured to: receive the multimedia message, and then send the multimedia message to the receiving end node which has established a virtual connection with the present broadcast source node;

the data forwarding module is configured to: forward the multimedia message to the other receiving end nodes which has established a virtual connection with the present receiving end node after the receiving end node receiving the multimedia message.

Furthermore, the data sending module is configured to: divide all the receiving end nodes in the application routing table into a plurality of sets according to the next hop node based on the preset rules when sending the multimedia message to the receiving end node which has established the virtual connection with the present node in the structured P2P network, each set corresponds to one next hop node; and duplicate the multimedia message as copies of which the number is the same as the total number of the sets into which the receiving end nodes are divided, and send the multimedia message respectively including the information of each set to the next hop node corresponding to each set;

the data forwarding module is configured to: after the receiving end node receives the multimedia message, and if the node is the only component in the set according to the information of the set included in the multimedia message, display the multimedia message to the users of the node; otherwise, divide all the receiving end nodes in the application routing table into a plurality of sets according to the next hop according to the preset rules, and duplicate the multimedia message as copies of which the number is the same as the total number of the sets into which the receiving end nodes are divided, and send the multimedia message respectively including the information of each set to the next hop node corresponding to each set.

Furthermore, the data sending module and data forwarding module adopt the following preset rules to divide all the receiving end nodes into sets:

if a certain receiving end node in the application routing table has established the virtual connection with the present node, newly establishing a set for the receiving end node, and adding the receiving end node into the set; and if a certain receiving end node in the application routing table has not establish the virtual connection with the node, searching the next hop node from the node to the receiving end node, and judging whether the set has been established for the next hop node, if the set has been established, adding the receiving end node into the set; if the set has not been established, newly establishing a set for the next hop node and adding the receiving end node into the set.

Although the present invention is described with reference to the specific examples, modifications and changes can be made without departing from the spirit or scope of the present invention for those skilled in the art. All these modifications and changes are regarded as within the scope of the present invention and the scope of claims appended to the present invention.

INDUSTRIAL APPLICABILITY

The present invention provides a method and a system for broadcasting a multimedia message, wherein each peer node (including the broadcast source) only forwarding a message once at most can ensure that all the nodes can receive the message by adopting the "relay broadcast" mode of the structured P2P network. Compared with the unicast method by the broadcast source one by one, the present invention can save the bandwidth and processing capacity resources of the whole overlay network to a great extent; furthermore, make the load to be more equably distributed to the nodes besides the broadcast source, and avoid that the broadcast source becomes a processing bottleneck.

What is claimed is:

1. A method for broadcasting a multimedia message, comprising:
a broadcast source node packaging multimedia contents to be broadcasted into a multimedia message, and sending the multimedia message to a receiving end node which has established a virtual connection with the present broadcast source node in a structured P2P network; and
the receiving end node which receives the multimedia message from the broadcast source node forwarding the multimedia message to other receiving end nodes which have established virtual connections with the present receiving end node;
each receiving end node which receives the multimedia message from a receiving end node forwarding the multimedia message to other receiving end nodes which have established virtual connections with the present receiving end node;
wherein:
in the step of sending the multimedia message to the receiving end node which has established the virtual connection with the present broadcast source node in the structured P2P network, the broadcast source node divides all the receiving end nodes in an application routing table into a plurality of sets according to a next hop based on a preset rule, each set corresponds to one next hop node; the broadcast source node duplicates the multimedia message as copies of which a number is same as a total number of the sets that all the receiving end nodes are divided, and sends the multimedia message including information of each set respectively to the next hop node corresponding to each set;
in the step of forwarding the multimedia message to other receiving end nodes which have established the virtual connections with the node, after receiving the multimedia message, if the receiving end node determines that the present receiving end node is an only component in the set according to the information of the set included in the multimedia message, the receiving end node displays the multimedia message to users of the present receiving end node; and if the present the receiving end node is not an only component in the set, the receiving end node divides all the receiving end nodes in the application routing table of the present the receiving end node into a plurality of sets according to a next hop based on the preset rule, and duplicates the multimedia message as copies of which the number is same as the total number of the sets that all the receiving end nodes are divided, and sends the multimedia message including information of each set respectively to the next hop node corresponding to each set.

2. The method according to claim 1, wherein:
in the step of the broadcast source node packaging the multimedia contents into the multimedia message, the broadcast source node packages the multimedia contents into an application layer data packet.

3. The method according to claim 1, wherein:
in the step of the broadcast source node packaging the multimedia contents into the multimedia message, when an application transmission protocol on the virtual connection is a Session Initiation Protocol (SIP), the broadcast source node adopts a format of Multipurpose Internet Mail Extensions (MIME) to package the multimedia contents into a message body of a MESSAGE request.

4. The method according to claim 1, wherein:
the preset rule is as follows:
if one receiving end node in the application routing table has established a virtual connection with a present node, newly establishing a set for the receiving end node, and adding the receiving end node into the set;
if one receiving end node has not established a virtual connection with the present node, searching a next hop node from the present node to the receiving end node, and judging whether a set has been established for the next hop node, if the set has been established, adding the receiving end node into the set; if the set has not been established, newly establishing a set for the next hop node and adding the receiving end node into the set.

5. The method according to claim 1, wherein:
the information of each set includes: list information of the receiving end nodes in the set.

6. A system for broadcasting a multimedia message, which is applied in a structured P2P network, comprising a broadcast source node and receiving end nodes, wherein:
the broadcast source node is configured to: package multimedia contents to be broadcasted into a multimedia message, and then send the multimedia message to the receiving end node which has established a virtual connection with the present broadcast source node;
a receiving end node is configured to: forward the multimedia message to other receiving end nodes which have established the virtual connections with the present receiving end node after the receiving end node receiving the multimedia message;
wherein,
the broadcast source node is configured to: when sending the multimedia message to the receiving end node which has established the virtual connection with the present broadcast source node in the structured P2P network, divide all the receiving end nodes in an application routing table into a plurality of sets according to a next hop based on a preset rule, in which each set corresponds to one next hop node; and duplicate the multimedia message as copies of which a number is same as a total number of the sets that all the receiving end nodes are divided, and send the multimedia message including information of each set respectively to the next hop node corresponding to each set;
the receiving end node is configured to: after the present receiving end node receiving the multimedia message, and if the node is an only component in the set according to the information of the set included in the multimedia message, display the multimedia message to users of the present receiving end node; otherwise, divide all the receiving end nodes in the application routing table into a plurality of sets according to a next hop based on the preset rule, and duplicate the multimedia message as copies of which the number is same as the total number of the sets that all the receiving end nodes are divided, and send the multimedia message including information of each set respectively to the next hop node corresponding to each set.

7. The system according to claim 6, wherein:
the broadcast source node and receiving end node adopt the following preset rule to divide all the receiving end nodes into the sets:
if a certain receiving end node in the application routing table has established a virtual connection with a present node, newly establishing a set for the receiving end node, and adding the receiving end node into the set;

if a certain receiving end node has not established a virtual connection with the present node, searching a next hop node from the present node to the receiving end node, and judging whether a set has been established for the next hop node, if the set has been established, adding the receiving end node into the set; if the set has not been established, newly establishing a set for the next hop node and adding the receiving end node into the set.

8. The method according to claim 2, wherein:
in the step of the broadcast source node packaging the multimedia contents into the multimedia message, when an application transmission protocol on the virtual connection is a Session Initiation Protocol (SIP), the broadcast source node adopts a format of Multipurpose Internet Mail Extensions (MIME) to package the multimedia contents into a message body of a MESSAGE request.

* * * * *